United States Patent
Schmidt et al.

(10) Patent No.: US 8,541,511 B2
(45) Date of Patent: Sep. 24, 2013

(54) AMPHIPHILIC BLOCK COPOLYMER FORMULATIONS

(75) Inventors: Scott C. Schmidt, Woodbury, MN (US); Noah E. Macy, Royersford, PA (US); Jean-Pierre Disson, Vernaison (FR)

(73) Assignee: Arkema Inc., King of Prussia, PA (US)

( * ) Notice: Subject to any disclaimer, the term of this patent is extended or adjusted under 35 U.S.C. 154(b) by 187 days.

(21) Appl. No.: 13/001,903

(22) PCT Filed: Jun. 15, 2009

(86) PCT No.: PCT/US2009/047314
§ 371 (c)(1),
(2), (4) Date: Dec. 29, 2010

(87) PCT Pub. No.: WO2010/005690
PCT Pub. Date: Jan. 14, 2010

(65) Prior Publication Data
US 2011/0112253 A1  May 12, 2011

Related U.S. Application Data

(60) Provisional application No. 61/078,613, filed on Jul. 7, 2008.

(51) Int. Cl.
*C08F 220/06* (2006.01)
*C08F 2/06* (2006.01)
*C08F 6/02* (2006.01)

(52) U.S. Cl.
USPC ........... 525/369; 525/299; 525/267; 525/191; 525/240; 525/323

(58) Field of Classification Search
USPC .................. 525/267, 299, 191, 240, 323, 369
See application file for complete search history.

(56) References Cited

U.S. PATENT DOCUMENTS

| | | | | |
|---|---|---|---|---|
| 6,437,040 | B2 * | 8/2002 | Anthony et al. | 524/505 |
| 6,506,837 | B2 | 1/2003 | Destarac et al. | |
| 7,183,351 | B2 | 2/2007 | Auguste et al. | |
| 7,510,817 | B2 | 3/2009 | Benoit et al. | |
| 7,517,634 | B2 | 4/2009 | Benoit et al. | |
| 7,745,535 | B2 | 6/2010 | Schmidt et al. | |
| 2002/0146495 | A1 * | 10/2002 | Loh et al. | 426/302 |
| 2003/0083423 | A1 * | 5/2003 | Wiercinski et al. | 524/522 |
| 2006/0003249 | A1 * | 1/2006 | Moudry et al. | 430/114 |
| 2006/0052545 | A1 | 3/2006 | Guerret et al. | |
| 2006/0074208 | A1 | 4/2006 | Laredo | |
| 2007/0009582 | A1 | 1/2007 | Madsen et al. | |
| 2007/0078197 | A1 * | 4/2007 | Samuelsen | 523/111 |
| 2008/0058475 | A1 | 3/2008 | Schmidt et al. | |
| 2008/0255492 | A1 | 10/2008 | Truelsen et al. | |
| 2009/0012208 | A1 | 1/2009 | Madsen et al. | |
| 2009/0270559 | A1 | 10/2009 | Schmidt et al. | |

FOREIGN PATENT DOCUMENTS

WO   WO 2007140225 A2 * 12/2007

* cited by examiner

*Primary Examiner* — Mark Kaucher
(74) *Attorney, Agent, or Firm* — Thomas F. Roland

(57) ABSTRACT

The invention relates to an amphiphilic block copolymer having an increased speed of water adsorption. The non-water soluble copolymer, having a hydrophilic middle block and hydrophobic endblocks, has a high rate water transmission and/or permeation. The increase in rate is due to neutralization, or partial neutralization of the hydrophilic block of the copolymer. Furthermore, the absorption rate can be controlled by the extent of the neutralization. Another aspect of the invention is the use of co-monomers and/or additives to further increase or tailor the water absorption properties. The use of additives and comonomers is also shown to enhance the processability of the disclosed polymer composition.

3 Claims, No Drawings

AMPHIPHILIC BLOCK COPOLYMER FORMULATIONS

FIELD OF THE INVENTION

The invention relates to an amphiphilic block copolymer having an increased speed of water adsorption. The non-water soluble copolymer, having a hydrophilic middle block and hydrophobic endblocks, has a high rate water transmission and/or permeation. The increase in rate is due to neutralization, or partial neutralization of the hydrophilic block of the copolymer. Furthermore, the absorption rate can be controlled by the extent of the neutralization.

Another aspect of the invention is the use of co-monomers and/or additives to further increase or tailor the water absorption properties. The use of additives and comonomers is also shown to enhance the processability of the disclosed polymer composition.

BACKGROUND OF THE INVENTION

Amphiphilic block copolymers are well known. The majority of amphiphilic polymers are diblock copolymers that are soluble in water. These diblock polymers are used to thicken aqueous solutions and form viscoelastic gels, such as those described in U.S. Pat. Nos. 6,506,837; 6,437,040, and US Patent application 2003/0162896.

Arkema patent application US 2006052545 describe diblock and triblock copolymer adhesives formed by a controlled radical polymerization that are capable of absorbing water and providing adhesion under humid conditions. This polymer could be water soluble.

Hydrogels are typically polymeric materials, which are capable of absorbing aqueous fluids. Hydrogels are generally hydrophilic polymeric materials that have been chemically crosslinked to remain insoluble in water (or hydrophobic chemically or physically cross-linked materials formulated with hydrocolloid materials). Hydrogels are often used in wound care, in hygiene articles, in filtration aids, as flexible cushioning materials, as control-release agents, and for the adsorption of aqueous-based fluids.

A multiblock amphiphilic block copolymer is described in US 2008/0058475, incorporated herein by reference. The non-water soluble multi-layer block has a hydrophilic middle block and hydrophobic outer blocks. It can be made by a controlled radical polymerization method. The physical properties, mechanical properties and the water absorption/transmission properties of the amphiphilic triblock copolymers described can be tailored by adjusting the levels and types of monomers in each of the block segments, as well as by adjusting the size and ratio of the blocks. Some of the properties that can be optimized include the level of water or other fluids absorbed and transmitted, gel strength, and other physical and mechanical properties. The use of ionic groups as hydrophilic monomers is disclosed and it is noted that the level of absorption in these materials is influenced by the resultant pH. In the case of acid based groups, the absorption level will increase as the relative pH increases. It is taught that this functionality can be used to control the ultimate level of absorption based on the pH of the environment. Therefore, it is the pH of the environment that controls the maximum absorption.

The amphiphilic block of the US 2008/0058475 application has excellent properties, and is useful in many applications, however, the rate of absorption for the exemplified polymers is slower than optimal in some applications. Also, due to the amphiphilic nature of the copolymers, they tend to be fairly viscous, creating issues of processability and isolation. These processability issues become magnified when the hydrophilic segments contain ionic groups and increase with the extent of neutralization, presumably due to increased ionic interactions.

WO 2005/032610 discloses a pressure sensitive adhesive containing an amphiphillic block copolymer in a rubbery elastomeric matrix. The reference exemplifies the use of sodium acrylate in an adhesive formulation but does not describe the benefit derived from such polymer. Also, the described polymer is a diblock which is water soluble and thus falls outside the scope of this non-water soluble hydrogel disclosure and furthermore the amount of neutralized polymer is low in the formulation and thus the effect on absorption rate is minimal, presumably because the neutralized portion is not the continuous phase, i.e., matrix.

It has now been found that the absorption rate of amphiphilic multiblock polymers can be dramatically increased by neutralizing (partially or fully) the hydrophilic monomer. The neutralization extent can in part be used to control the desired absorption rate. The neutralization tends to increase the viscosity leading to difficulties in polymer processing and end-use article fabrication. Processability of the multi-layer amphiphilic block copolymers can be improved by the use of a diluent, preferably a plasticizer for the neutralized hydrophilic polymer segment. In a preferred embodiment, the diluent used is a water absorbing diluent.

SUMMARY OF THE INVENTION

The invention relates to an amphiphilic multiblock copolymer composition comprising an amphiphilic copolymer comprising:
  a) at least one hydrophilic middle block; and
  b) hydrophobic end blocks;
wherein said multiblock copolymer is water insoluble, wherein at least one block is a profiled block, wherein said hydrophilic block is partly or fully neutralized, and wherein said copolymer absorbs greater than 5 weight percent of its maximum absorption capacity in the initial 30 minutes of exposure to a saturated solution.

The invention also relates to a process for forming a pre-neutralized amphiphilic multiblock copolymer composition.

DETAILED DESCRIPTION OF THE INVENTION

Applicant's invention is to a processable amphiphilic copolymer having a high rate of water absorption. The high rate of water absorption is achieved by neutralization (partially or fully) of the hydrophilic block. It is preferred that the neutralized block consists of the matrix or majority phase. The introduction of ionic groups through the neutralization tends to increase the viscosity leading to difficulties in polymer processing and end-use article fabrication.

The processability of the neutralized polymer is improved and made feasible through the use of a diluent. The diluent chosen typically has an affinity for the hydrophilic polymer segment, but could also have affinity for the hydrophobic segments or a combination thereof. Another disclosed method to increase the processability and absorption rate is to copolymerize the neutralizable monomer with a non-neutralizable monomer that has a low glass transition temperature (Tg). The multiblock copolymers having a general structure of a hydrophilic copolymer middle block or blocks and hydrophobic outer blocks. The hydrophobic endblocks will form physical crosslinks to form a water insoluble polymer composite. By hydrophilic is meant a segment that is water soluble, water dispersible, or generally capable of absorbing and/or transmitting water.

By "dispersible" is meant the copolymer forms a stable uniform suspension (without the addition of further materials such as emulsifiers) when combined with water at 25° C. Since the disclosure relates to increased rate through neutralization, at least one hydrophilic segment must contain one or more groups capable of being neutralized.

By "multiblock" copolymer, as used herein, is meant any controlled architecture polymer having three or more blocks. All endblocks of the copolymer structure will be hydrophobic blocks. The materials are all non-water soluble, thus diblock copolymers are specifically excluded. Examples of multiblock copolymers of the present invention include, but are not limited to, ABA or ABA' triblock polymers where A is a hydrophobic block, B is a hydrophilic block and A' is an hydrophobic block different from A, ABABA block polymers where A is a hydrophobic block and B is a hydrophilic block, ABCBA block copolymers where A is a hydrophobic block, star block copolymers, comb polymers, gradient polymers, and other polymers having a blocky structure, which will be known by those skilled in the art; and C represents a block that can be a homopolymer, or random copolymer, can be of a hydrophilic or hydrophobic nature, and is different in composition from blocks A and B. In a preferred embodiment, the multiblock copolymer is an ABA type triblock copolymer. By "copolymer", as used herein, means at least two different types of blocks are present, though each block may contain more than one type of monomer unit.

By "amphiphilic" as used herein means that the center block of an ABA triblock copolymer is water soluble, water dispersible, or generally capable of absorbing and/or transmitting water, while the end blocks are water insoluble.

By "water insoluble copolymer" as used herein is meant that the polymer block segment is non-soluble or non-dispersible in water. Less than 100 mg/mL of the amphiphilic copolymer will dissolve in water at 25° C., more preferably less than 50 mg/mL, and most preferably less than 20 mg/mL. The "water insoluble copolymer" segment as used herein is also not generally soluble or dispersible in other polar solvents, such as $C_{1-3}$ alcohols. On the other hand, an amphiphilic di-block copolymer would be soluble or dispersible in water and not of the present invention.

The midblock of the triblock copolymer has an affinity for water or is deemed as a hydrophilic polymer. By "hydrophilic" or "hydrophilic polymer" as used herein is meant the polymer block segment is water soluble, water dispersible, or generally capable of absorbing and/or transmitting water. The hydrophilic middle block could be a hydrophilic homopolymer, a random copolymer containing one or more hydrophilic monomers, or a random copolymer containing one or more hydrophilic monomers with one or more hydrophobic monomers. At least one hydrophilic segment must contain one or more monomers capable of being neutralized. These neutralizable monomers include acids, bases, amines, and anhydrides as will be evident to those skilled in the art. Specific useful monomers include, but are not limited to maleic anhydride, maleic acid, substituted maleic anhydride, itaconic anhydride, itaconic acid, substituted itaconic anhydride, fumaric acid, fumaric anhydride, fumaric acid, substituted fumaric anhydride, crotonic acid and its derivatives, acrylic acid, methacrylic acid, and basic derivatives of styrene such as styrene sulfonic acid, dimethylaminoethyl acrylate, diethylaminoethylacrylate, acrylamido 2-methyl 2-propane sulfonate It is possible for the hydrophilic block to be a homopolymer of monomers containing groups capable of being neutralized. More preferred is the use of monomers containing groups capable of being neutralized in copolymerization with non-neutralizable monomer units.

Other Ethylenically unsaturated monomers useful as comonomers in forming the hydrophilic middle block polymer include but are not limited to the salts, esters, anhydrides and amides of methacrylic and acrylic acid; dicarboxylic acid anhydrides; carboxyethyl acrylate; hydrophilic derivatives of styrene; and acrylamides. Specific useful monomers include, but are not limited to dimethylacrylamide, diethyl acrylamide, n-isopropylacrylamide, vinylpyrrolidone, 2-carboxyethyl acrylate, methyl acrylate, ethyl acrylate, butyl acrylate, ethylhexyl acrylate, octyl acrylate, tert-butyl acrylate, 2-methoxyethyl acrylate, hydroxyethyl acrylate, hydroxyethyl methacrylate, polyethylene glycol acrylate, polyethylene glycol methacrylate.

The number average molecular weight of the midblock is in the range of 2 kg/mol to 160 kg/mol, preferably 10 kg/mol to 120 kg/mol, and most preferably 15-100 kg/mol.

The endblocks of the multiblock copolymer are the same or different and are hydrophobic homopolymers, random copolymers containing one or more hydrophobic monomers, or a random copolymer containing one or more hydrophobic monomers with one or more hydrophilic monomers. By "hydrophobic" and "hydrophobic polymer" as used herein is meant the polymer block segment is non-soluble or dispersible in water. Examples of ethylenically unsaturated monomers useful in forming the hydrophobic end polymer blocks include, but are not limited to, styrene, hydrophobic derivatives of styrene, conjugated dienes, $C_{3-30}$ straight or branched alkyl, and arylacrylates, $C_{1-30}$ straight or branched alkyl, and aryl methacrylates, olefins, fluorine-containing monomers, and silicon-containing monomers Specific examples of the hydrophobic monomers include styrene; alpha-methyl styrene, lauryl methacrylate (or other long chain alkyl acrylates or methacrylates, e.g., $C_4$-$C_{30}$ alkyl esters 2-ethylhexyl acrylate and 2-ethylhexylmethacrylate, octyl acrylate, and octyl methacrylate, decyl acrylate and decyl methacrylate, etc.), short chain methacrylates such as methyl and ethyl methacrylate, 1,1-dihydroperfluoroalkyl acrylates and methacrylates of the general structure, $CF_3(CF_2)_nCH_2OCOC(R)=CH_2$, in which R is hydrogen or methyl and n is typically 2 to 20, hexafluorobutyl acrylate, triisopropylsilyl acrylate, isobornyl acrylate, isobornyl methacrylate, butadiene, isoprene, methylmethacrylate, t-butyl acrylate and t-butyl methacrylate. Preferred monomers include, styrene, methylmethacrylate, t-butyl acrylate, t-butyl methacrylate, isobornyl acrylate, isobornyl methacrylate, a mixture of 1,1-dihydroperfluoroalkyl acrylates and methacrylates of the general structure, $CF_3(CF_2)_nCH_2OCOC(R)=CH_2$, in which R is hydrogen or methyl and n is typically 6 to 18.

The number average molecular weight of each end blocks is in the range of 0.5 kg/mol to 80 kg/mol, preferably 3 kg/mol to 60 kg/mol.

Examples of amphiphilic triblock copolymers useful in the invention would include, but not limited to, PS-P(AA/BA)-PS, PS-P(AA/MEA)-PS, PS-P(MAA/BA)-PS, PS-P(BA/CEA)-PS, PtBMA-PDMA/AA-PtBMA, PS-P(DMA/AA)-PS, P(tBA)-P(AA/MEA)-P(tBA), PLMA-P(AA/MEA)-PLMA, PBHA-P(AA/MEA)-PBHA, PMMA-P(AA/BA)-PMMA, PtBMA-PBA/AA-PtBMA, PMMA-P(AA/BA)-PS, PMMA-P(MAA/PEGm/BA-PMMA, PS-P(MAA/PEGm/MA)-PS etc. where PS is polystyrene, AA is acrylic acid, MAA is methacrylic acid, BA is butyl acrylate, MEA is methoxyethyl acrylate, tBA is t-butyl acrylate, tBMA is t-butylmethacrylate, PLMA is polylauryl methacrylate, PBHA is polybehenyl acrylate, CEA=carboxyethyl acrylate, and DMA is dimethylacrylamide. In all cases PS, PMMA, tBA and PtBMA can be used interchangeably for the hydrophobic blocks. MAA and AA can also be used interchangeable and polyethyleneglycol acrylate (PEGa) and polyethylene glycol methacrylate (PEGm) monomers are preferably incorporated as comonomers within the hydrophilic block segments.

The triblock copolymers of the present invention are formed by a controlled radical polymerization process. These processes generally combine a typical free-radical initiator with a compound to control the polymerization process and produce polymers of a specific composition, and having a controlled molecular weight and narrow molecular weight range. These free-radical initiators used may be those known in the art, including, but not limited to peroxy compounds, peroxides, hydroperoxides and azo compounds which decompose thermally to provide free radicals. In one preferred embodiment the initiator may also contain the control agent. In another preferred embodiment the initiator and controller are combined into an alkoxyamine.

Block copolymers of the present invention are preferably those formed by controlled radical polymerization (CRP). When a copolymer segment is synthesized using a CRP technique such as nitroxide-mediated polymerization, it is often termed a gradient or profiled copolymer. This type of copolymer is different than a copolymer obtained by a traditional free radical process. The properties of the copolymer will be dependant on the monomer composition, control agent used, and polymerization conditions. For example, when polymerizing a monomer mix by traditional free radical polymerizations, a statistical copolymer is produced, as the composition of the monomer mix remains static over the lifetime of the growing chain (approximately 1 second). Furthermore, due to the constant production of free radicals throughout the reaction, the composition of the chains will be non-uniform. During a controlled radical polymerization the chains remain active throughout the polymerization step (i.e., the monomer mix is not static over the lifetime of the growing chain), thus the composition of the chains is uniform and is dependant on the corresponding monomer mix with respect to the reaction time. In a preferred embodiment, the hydrophilic copolymer segment of the invention is a profiled copolymer.

Combining the favorable characteristics of profiled copolymers with the desirable properties of block copolymers leads to materials having advantageous end-use properties by tailoring the monomer composition and sequencing. The use of profiled or gradient block structures allows the final polymer properties to be tuned based on application needs. For example, the properties attained in traditional copolymers are typically an average of the properties imparted by the resultant monomers incorporated, while block copolymers lead to a composite material containing the characteristic properties inherent to each parent polymer block segment. The incorporation of a profiled segment, allows for the tuning of each block segment and sometimes can further simplify the polymer synthesis process. One example is tailoring a segment's glass transition temperature (Tg) e.g., by incorporating a low Tg monomer in a high Tg polymer segment, which allows for an overall reduction of the segment Tg. Another example is reducing the hydrophilicity of a segment by incorporating a hydrophobic comonomer.

In one embodiment of the invention, the triblock copolymer is a thermoplastic elastomer. A thermoplastic elastomer generally consists of an ABA type triblock copolymer in which the A blocks contain high Tg segments or hard blocks and the B block is comprised of a low Tg segment or soft block. The A block Tg usually ranges from 0 to 300° C., preferably from 25 to 200° C. and more preferably from 30 to 150° C. The Tg of the B block is typically from −200 to 130° C., preferably from −100 to 70° C., and more preferably from −80 to 30° C. The main requirement is that the A blocks contain a hard segment and the B block contains a soft segment. ABA triblock thermoplastic elastomers are one particularly useful class of amphiphilic polymers. The profiled copolymer approach lends the ability to tailor the resultant elasticity, Tg, adhesion properties, solubility, etc. by simply varying the comonomer amounts and composition.

Examples of controlled radical polymerization techniques will be evident to those skilled in the art, and include, but are not limited to, atom transfer radical polymerization (ATRP), reversible addition fragmentation chain transfer polymerization (RAFT), nitroxide-mediated polymerization (NMP), boron-mediated polymerization, and catalytic chain transfer polymerization (CCT). Descriptions and comparisons of these types of polymerizations are described in the ACS Symposium Series 768 entitled *Controlled/Living Radical Polymerization: Progress in ATRP, NMP, and RAFT*, edited by Krzystof Matyjaszewski, American Chemical Society, Washington, D.C., 2000.

In principle, any living or controlled polymerization technique, compatible with the monomer choices, can be utilized to make the block copolymer. One preferred method of controlled radical polymerization is nitroxide-mediated CRP. Nitroxide-mediated CRP is preferred as it allows for the use of a larger variety of monomers in the triblock copolymer, including the use of acrylics and especially acid functional acrylics. The synthesis of a nitroxide-mediated CRP multiblock amphiphilic copolymer of the invention is found in US 2008/0058475, incorporated herein by reference.

The amphiphilic triblock copolymers of the invention generally have a molecular weight (Mw) in the range of from 20 kg/mol to 400 kg/mol.

Based on the amphiphilic nature of the polymers described in this invention, it is presumed the hydrophobic segments form domains, which serve as physical crosslinks preventing dissolution in water. The amphiphilic multiblock copolymer is "water insoluble" as well as in other solvents in which the hydrophobic block is not soluble.

The Tg of the middle block will typically be lower than that of the outer block, or if the middle block of the parent block copolymer has a higher Tg, upon water absorption the apparent Tg will become lower than the endblocks. In general, the end blocks have a high Tg, most preferably higher than body temperature, and more preferably higher than 50° C. In the case of long chain alkyl (meth)acrylates the Tg is below RT, but the melting temperature is >25° C.

Preferably the middle block(s) will contain a higher weight percent than the endblocks, thus the continuous matrix of the block copolymer will contain the neutralizable monomer units.

An important feature of the present invention is that the composition and structure of the amphiphilic copolymers can be readily tailored to produce a wide range of physical and mechanical properties, such as water absorption, gel strength, water permeation, adhesion, and such. The property control of a nitroxide-mediated CRP multiblock amphiphilic copolymer of the invention is found in US 2008/0058475, incorporated herein by reference.

One aspect of control not described in US2008/0058475 is the effect of pre-neutralization on absorption rate. The level of water adsorption, or other polar solvent adsorption can be controlled by adjusting the degree of neutralization of the neutralization-sensitive hydrophilic comonomers of the hydrophilic block. I.e., the level and rate of absorption is pH dependant. For example, polyacrylic acid hydrogels placed in a low pH solution will absorb less than those placed in a neutral pH solution. In the described example, the rate of swelling for both solutions is relatively slow as it takes time for the solution to penetrate and neutralize the non-neutralized (and less hydrophilic) polymer.

In order to increase the absorption rate, the neutralizable monomers must be pre-neutralized before exposure to the solution. The extent of pre-neutralization will greatly affect the rate of absorption. For example, if a hydrophilic block contains 50% of a neutralization sensitive monomer, increasing the amount of that monomer pre-neutralized will increase the absorption rate, i.e., the absorption rate of 100% neutralized>50% neutralized>10% neutralized>0% neutralized (provided the hydrophobic and hydrophilic components remain fixed and only the wt % neutralization is altered).

The amphiphilic copolymer of the invention is pre-neutralized. By "neutralized" as used herein is meant that the hydrophilic central block of the amphiphilic copolymer is fully or partially in the salt form. Neutralization can take place at any point during the polymerization, or as a post-polymerization process, such as, during the formulation, blending, or fabrication of a film, article, or part.

In one embodiment, the polymerization could start with some or all of the hydrophilic monomer in the salt form, such as an ammonium salt, potassium salt, sodium salt, as will be evident to those skilled in the art. In another embodiment, the monomer could be neutralized at some point during the polymerization. For example, if acrylic acid is used as the neutralizable monomer, sodium or potassium hydroxide could be added directly during the polymerization process. In a preferred embodiment, neutralization occurs after the multi-block copolymer has been fully synthesized, by post-treatment of the polymer. Useful neutralization reagents include ammonium hydroxide, aminomethyl propanol, sodium hydroxide, potassium hydroxide, lithium hydroxide, calcium hydroxide, and others as will be evident to those skilled in the art. The amount of the neutralization reagent added can be calculated to provide the desired level of neutralization. It is preferred that at least 5% of the neutralizable monomer is neutralized and more preferable that >10% but <80% of the neutralizable monomer is neutralized. It has been found that higher levels of neutralization lead to greater increases in the rate of water adsorption.

To aid in homogeneous neutralization, and more importantly to also improve the processing of the copolymer, a diluent may optionally be admixed into the polymer. The diluent is preferably added to the system after polymerization is completed, though it could be added at the beginning of the polymerization process or at anytime during the polymerization, or added at anytime between the polymerization and processing of the polymer. The diluent can be selected to plasticize the hydrophilic segment, the hydrophobic segment, or both. Preferably the diluent selected is a plasticizer for the hydrophilic block of the copolymer, thus diluents having a hydrophilic nature are preferred. Examples of diluents useful in the invention include, but are not limited to polyethylene glycol and its derivatives, methoxy polyethylene glycol, polypropylene glycol, etc. The diluent can be added in any amount, but it is preferred that the diluent is added at an amount >5 wt % but <50 wt %. In one embodiment, diluent is added in an amount to reduce the viscosity of the admixture by 50%.

In one preferred embodiment of the invention, the amphipilic copolymer is polymerized by a solvent CRP polymerization. Diluent is then added, along with one or more bases, and the admixture is stirred until a homogeneous composition is formed. The homogeneous composition is then processed and devolitized to form a final formulated product.

The non-neutralized amphiphilic block copolymer is easier to process and isolate that the neutralized polymer, thus, the optional addition of a diluent will improve the processing.

Preferably, any added diluent is relatively high boiling, such that it remains as the solvent is flashed off during processing of the copolymer. Examples of processes that involve flashing of solvent include, but are not limited to, devolitizing extrusion, wiped film evaporation (thin film evaporation), and solvent casting.

Other additives can also be added to the neutralized amphiphilic polymer, as known in the art, for example, a tackifier can be added to create an adhesive formulation. The neutralized polymer can be mixed with other polymers to form polymeric composite materials. For example, could be blended with hydrophobic polymers to impart some hydrophilic properties.

In another embodiment of the invention, a reactive monomer can be added to the block copolymer, for later reactions such as cross-linking, or to increase bonding to a substrate. An example would be the inclusion of anhydride monomer units in the copolymer, which could later react with hydroxide units, such as, for example, polyethylene glycol. Other examples of reactive monomer that cam be polymerized into the copolymer include hydroxyl ethyl (meth)acrylate, glycidal methacrylate, or butane diol diacrylate. These reactive monomers could be included in the hydrophilic or hydrophobic segment.

The pre-neutralized amphiphilic multi-block copolymer adsorbs water and saturated polar solutions at a rate far faster than non-preneutralized amphiphilic multiblock copolymers. The amphiphilic multiblock copolymer absorbs greater than 5 weight percent, preferably greater than 10 weight percent, and more preferably greater than 20 weight percent, of its maximum absorption capacity in the initial 30 minutes of exposure to a saturated solution.

Because of the properties of the amphiphilic multiblocks, and the ability to tailor the properties widely by adjusting the composition, there are many possible uses of these materials. The compositions of the invention are in the form of hydrogels.

Exemplary uses include, but are not limited to the following. One of skill in the art could use these examples and the teaching of this invention to imagine many other uses for the amphiphilic triblock copolymers.

Health care, personal care and cosmetic uses: as a medium for absorbing extudate—such as blood, and urine in articles such as tampons, diapers, sanitary napkins; Ostomy care; Control release media (for drugs, antimicrobials, fragrances, etc. . . ); Bandages; Contact lenses; Artificial tissues; Rheumatic plasters; Ultrasound gel; Cosmetic gelation agent for carrying cosmetically active materials, in a glycerin, glycol, silicon, water, or alchohol-based system. Cosmetic thickeners; Sunscreen; Superabsorbents.

Consumer products: Insoles; Synthetic fibers; Textiles—(gloves, sportswear, moisture regulation in textiles, shoe inserts);

Agro uses: Agricultural media for control of soil moisture or for release of fertilizer; Soil moisture control as a film or soil additive, for retention of meltwater and dew precipitates; Composting additive; Protection of forests against fungal and insect infestation.

Industrial uses: Packaging materials for water-sensitive articles; Food packaging for adsorbing water/blood in fresh meat, fish and poultry; Thickeners for oil/water and water/oil emulsions; Compatibilizers for amphiphilic polymer blends, Chemical process applications (catalyst for organic reactions, immobilization of large functional molecules (enzymes), Surface modifiers; Lubricious coatings; Self-cleaning coatings (architectural coatings); Adhesives; Membranes and membrane coatings (since there is no covalently cross-linked); Removable coatings; Gel electrophoresis which currently uses an acrylamide-based system—providing a material much less toxic than current systems; Shock absorbers; Heat storage media; Filtration aids, Hydrophilic component in polymer laminates; Dispersants; Liquefiers; Building construction, Vibration-inhibiting medium; Tunneling aid in water-rich ground; Cable sheathing; Water treatment; Waste treatment, Water removal (de-icers, reusable sandbags); Cleaning; fire protection of structures and forests; Coextrusion agent in thermoplastic polymers (hydrophilicization of multilayer, Films; Films and thermoplastic moldings capable of absorbing water (for example films for keeping fruit and vegetables fresh by regulating moisture so neither fouling nor wilting occurs.

EXAMPLES

The controlled architecture amphiphilic block copolymers were synthesized using the following generic protocol. Molecular weights were targeted by manipulating the monomer to initiator concentration ([M]/[I]). Therefore a targeted molecular weight could be achieved by setting the [M]/[I] ratio, and then carrying out the polymerization to the desired conversion necessary to reach the target molecular weight. Monomer conversion was conveniently monitored by gas chromatography (GC) analysis or flash devolitization of the unreacted monomer under vacuum. The polymer examples were run neat or in solution. Typical solvents used included, dioxane, n-methylpyrrolidinone, dimethylacetamide, dimethylformamide, tert-butyl alcohol, n-butyl alcohol, toluene, ethyl benzene, methyl acetate, ethyl acetate, propyl acetate, butyl acetate, ethanol, cyclohexanone, cyclopentanone and methyl ethyl ketone. Polymerizations were carried out at ambient pressures or run under nitrogen pressure up to 100 psi. Polymerizations were run in standard polymerization vessels both with and without shearing capacity, although adequate mixing capabilities were preferred.

As a general procedure, a specific amphiphilic triblock copolymer composition is prepared by various traditional monomer addition and polymer isolation protocols, as generically described below and evident to those skilled in the art, dependant on the desired final block composition.

For example, a pure block copolymer is prepared by isolating the pure 1st block by precipitation techniques or by evaporating the residual monomer upon completion of the first block synthesis, followed by the addition of a second monomer composition different from the first. This second monomer composition then undergoes polymerization to make the pure block copolymer.

Profiled block copolymers were synthesized by polymerizing a mixture of two or more monomers. This mixture could result, for instance, by adding a second monomer to the initial polymerization medium prior to evaporation of the residual first monomer, or a multi-monomer mix could be polymerized as a first block, or a multi-monomer mix could be added to an isolated pure first block.

Block copolymer/homopolymer blends were prepared by employing well known chasing techniques. For example, a first block is synthesized by polymerizing a monomer or monomer mix to a desired conversion (less than 100%). The reaction mixture is then cooled to a temperature where the nitroxide is stable at which time a secondary initiation source, such as an organic peroxide, is added to carry out the polymerization of the residual $1^{st}$ block monomers. After the chasing step is complete, the $2^{nd}$ block monomers) can be added and the temperature increased to allow for the activation of the nitroxide end groups, which subsequently leads to the formation of a block copolymer. The composite material will then comprise of both the chased homopolymer (similar in nature to the $1^{st}$ block) and a block copolymer. The chasing step can be carried out again with the $2^{nd}$ block or can be used in place of the $1^{st}$ block chase.

The synthesis of a nitroxide-mediated CRP multi-block amphiphilic copolymers containing neutralizable groups can be found in US 2008/0058475. Other copolymers of the invention can be prepared in an analogous manner, as it will be evident to those skilled in the art.

The following example is representative of the disclosure.

Example 1

An ABA triblock copolymer that contains A blocks comprising polymethylmethacrylate and polybutylacrylate (PMMA/BA) and a B block of polyacrylic acid and polybutylacrylate (PAA/BA) was prepared to give a PMMA/BA-b-PAA/BA-PMMA/BA triblock copolymer. The hydrophilic midblock contains approximately 20 wt % AA. Films of the above polymer were made by first dissolving the polymer in ethyl acetate, then adding the base and/or plasticizer/diluent. The solutions were cast into thin films (approximately 5 mm thick) and dried under vacuum to remove all residual solvent and monomers. The polymer films were then placed into water and re-weighed at various times to determine the amount or absorption. The results of pre-neutralization and plasticization are given in Table 1 below.

In each case, the pre-neutralized samples absorbed >20% of the maximum amount in less than 26 minutes. In comparison, the non-neutralized sample absorbed much less than 20 wt % in the first 25 minutes.

TABLE 1

Water Absorption Data vs. Time.

| | Neutralized/ treated with | Wgt (g) at time zero | Time Mins. | Wgt (g) | Time Min. | Wgt (g) | Time Min. | Wgt (g) | Max water absorption |
|---|---|---|---|---|---|---|---|---|---|
| 1 | None | 0.115 | 25 | 0.115 | 95 | 0.116 | 1200 | 0.116 | 0.8% |
| 2 | 0.2 meq AMP | 0.159 | 25 | 0.168 | 95 | 0.171 | 1200 | 0.191 | 20.3% |
| 3 | 0.2 meq KOH | 0.285 | 25 | 0.294 | 95 | 0.300 | 1200 | 0.320 | 12.4% |
| 4 | 0.2 meq KOH + .5 meq MPEG350 | 0.455 | 25 | NM | 95 | NM | 1200 | NM | NM |
| 5 | 0.5 meq KOH | 0.107 | 10 | 0.4037 | 45 | 0.7319 | | | 584.0% |
| 6 | 0.5 meq AMP | 0.156 | 10 | 0.4544 | 45 | 0.9403 | | | 502.4% |

TABLE 1-continued

Water Absorption Data vs. Time.

| | Neutralized/ treated with | Wgt (g) at time zero | Time Mins. | Wgt (g) | Time Min. | Wgt (g) | Time Min. | Wgt (g) | Max water absorption |
|---|---|---|---|---|---|---|---|---|---|
| 7 | 0.5 meq KOH + .5 meq MPEG350 | 0.398 | 10 | NM | 95 | 2.4742 | | | 522.4% |

Wherein; AMP = aminomethylpropanol, KOH = potassium hydroxide, MPEG350 = methoxypolyethylene glycol (with a Mw = 350 g/mole). NM = not measured.

What is claimed is:

1. A process for forming a partially neutralized amphiphilic multiblock copolymer thermoplastic elastomer composition having an increased rate of water adsorption over a non-neutralized copolymer comprising the steps of:
   a) forming an amphiphilic multiblock copolymer comprising at least one hydrophilic middle block; and at least one hydrophobic block on each end of the copolymer;
   b) admixing 5 to 50 weight percent of a diluent, based on the copolymer composition, prior to the addition of all of the base in step c), wherein said dilutent is selected from the group consisting of polyethylene glycol, polyethylene glycol derivatives, methoxy polyethylene glycol and polypropylene glycol, and
   c) partially neutralizing said amphiphilic copolymer during or after the addition of the diluent by the addition of a base wherein the hydrophilic block contains a neutralizable monomer that is neutralized at greater than 10% and less than 80%.

2. The process of claim 1, wherein said amphiphilic copolymer is formed using a controlled radical polymerization process.

3. The process of claim 1, further comprising the step of removing said diluent from said copolymer during or after the processing step.

* * * * *